United States Patent [19]

Takado et al.

[11] Patent Number: 5,384,172
[45] Date of Patent: Jan. 24, 1995

[54] MULTI-LAYER PLASTIC FUEL TANK

[75] Inventors: Yutaka Takado; Toshikazu Nakasato; Tetsuro Nogata, all of Yokohama; Eiji Tezuka; Toshio Yokoi, both of Toyota, all of Japan

[73] Assignees: Tonen Chemical Corporation, Tokyo; Toyota Jidosha Kabushiki Kaisha, Toyota, both of Japan

[21] Appl. No.: 110,756

[22] Filed: Aug. 23, 1993

Related U.S. Application Data

[63] Continuation of Ser. No. 715,246, Jun. 14, 1991, abandoned.

[30] Foreign Application Priority Data

Jun. 15, 1990 [JP] Japan ................ 2-157055
Jun. 15, 1990 [JP] Japan ................ 2-157056

[51] Int. Cl.⁶ .......................... B65D 88/02; B65D 88/12
[52] U.S. Cl. ............................. 428/35.7; 428/36.7; 428/475.8; 428/476.1; 428/516; 428/520; 280/830; 206/0.6; 220/4.13; 220/4.14; 220/586
[58] Field of Search ............... 428/35.7, 320.2, 476.1, 428/475.8, 516, 36.7, 520; 220/3, 4.12, 4.13, 4.14, 586; 206/0.6; 280/830, 831, 832

[56] References Cited

U.S. PATENT DOCUMENTS

| | | | |
|---|---|---|---|
| 3,423,231 | 5/1965 | Lutzmann | 428/475.8 |
| 3,988,499 | 10/1976 | Reynolds | 428/475.8 |
| 4,481,262 | 11/1984 | Shida | 428/476.1 |
| 4,543,291 | 9/1985 | Giles | 428/520 |
| 4,588,648 | 5/1986 | Krueger | 428/476.1 |
| 4,668,571 | 5/1987 | Moriarty, Jr. | 428/327 |
| 4,746,562 | 5/1988 | Fant | 428/36.7 |
| 5,073,420 | 12/1991 | Yaw et al. | 428/520 |

FOREIGN PATENT DOCUMENTS

| | | |
|---|---|---|
| 0344373 | 6/1989 | European Pat. Off. |
| 2538892 | 3/1977 | Germany |
| 0142650 | 11/1980 | Japan |
| 56-120345 | 9/1981 | Japan |

OTHER PUBLICATIONS

Database WPIL, No. 81-80 885, Derwent Publications Ltd., London, Great Britain & JP-A-56 120 345 (Sekisui Chemi. Ind. K.K) Sep. 21, 1981.

*Primary Examiner*—Ellis P. Robinson
*Assistant Examiner*—Rena L. Dye
*Attorney, Agent, or Firm*—Armstrong, Westerman, Hattori, McLeland & Naughton

[57] ABSTRACT

A multi-layer plastic fuel tank is constituted by at least one high-density polyethylene layer, at least one polyamide layer, and at least one modified high-density polyethylene layer made of high-density polyethylene modified with an unsaturated carboxylic acid or its derivatives, which is interposed between each high-density polyethylene layer and each polyamide layer for bonding them, the polyamide layer being made of a polyamide copolymer comprising 90-60 weight % of polyamide 6 and 10-40 weight % of polyamide 66.

5 Claims, 3 Drawing Sheets

MULTI-LAYER PLASTIC FUEL TANK

This application is a continuation of application Ser. No. 07/715,246 filed Jun. 14, 1991, now abandoned.

BACKGROUND THE INVENTION

The present invention relates to a multi-layer plastic fuel tank, and more particularly to a multi-layer plastic fuel tank comprising at least one high-density polyethylene layer, at least one polyamide layer and at least one modified high-density polyethylene layer and well moldable at a low temperature. It also relates to a method of producing a multi-layer plastic fuel tank by forming its high-density polyethylene layer by reusing flashes, defective moldings, etc. of multi-layer plastic fuel tanks as regenerated products.

Polyolefin resins are inexpensive and strong, and excellent in a weathering resistance, a chemical resistance, etc., so that they are widely used for various containers, etc. However, the polyolefin resins do not necessarily have sufficient gas barrier properties. Accordingly, they cannot be used for fuel tanks for gasoline, etc. in countries having strict regulations.

In view of the above, various attempts have been made to provide thermoplastic resin compositions having excellent mechanical strength and gas barrier properties by blending polyamides such as nylons having excellent gas barrier properties with the polyolefin resins (Japanese Patent Laid-Open Nos. 54-123158, 59-232135, 62-158739, 62-241938 and 62-241941). Also, instead of blending, it was proposed to laminate polyamide layers and polyolefin resin layers to produce multi-layer plastic fuel tanks having improved gas barrier properties (Japanese Patent Laid-Open No. 55-121017 and Japanese Patent Publication No. 60-14695). In this case, since the polyolefin resin layers generally have a relatively poor bonding strength to the polyamide layers, they are laminated via modified plastic layers such as those made of polyolefin resins modified with unsaturated carboxylic acids or their derivatives. Such multi-layer moldings for fuel tanks are generally produced by forming parisons by a usual extrusion molding method and then subjecting the parisons to blow molding (Japanese Patent Laid-Open Nos. 58-220738, 62-110526).

Japanese Patent Publication No. 60-34461 discloses a method of producing a multi-layer, blow-molded container constituted by a laminate of a polyolefin resin layer, a polyamide or saponified ethylene-vinyl acetate copolymer layer and an intermediate layer interposed therebetween, the intermediate layer being made of a modified ethylene copolymer produced by grafting 0.01–1 weight % of maleic anhydride to a copolymer of ethylene and an α-olefin having 3 or more carbon atoms and showing a crystallinity of 2–30%.

However, the polyamide layers of the above multi-layer moldings are usually made of polyamide 6, and from the viewpoint of moldability of the polyamide layer, the temperature of the high-density polyethylene layer (main layer) should be higher than that of a single-layer plastic fuel tank made of high-density polyethylene only. As a result, there arises a problem of drawdown of a parison.

Apart from the above, since large amounts of flashes, defective moldings, etc. are generated in the course of blow molding, it was proposed to recover those flashes, defective moldings, etc. and reuse them by mixing them with polyolefin resins (Japanese Patent Laid-Open Nos. 54-113678 and 55-91634).

Japanese Patent Laid-Open Nos. 55-91634 discloses a multi-layer molding constituted by a laminate of (a) a polyolefin resin layer, (b) a polyamide layer obtained by melt-blending (i) a modified polymer produced by grafting maleic anhydride to an ethylene/α-olefin copolymer having a crystallinity of 1–35% and a melt index of 0.01–50 g/10 minutes (maleic anhydride content: 0.05–1 weight %) and (ii) polyamide, and (c) a modified polyolefin resin layer made of a modified polymer produced by grafting maleic anhydride to an ethylene/α-olefin copolymer having a crystallinity of 2–30% and a melt index of 0.01–50 g/10 minutes (maleic anhydride content: 0.01–1 weight %), which is interposed between the polyolefin resin layer and the polyamide layer for bonding them, the multi-layer molding suffering from only little deterioration of mechanical strength even though flashes, defective moldings, etc. of the multi-layer moldings are reused as part of starting materials.

However, thermoplastic resin compositions having satisfactory bonding strength and impact resistance cannot necessarily be obtained simply by mixing the flashes, defective moldings, etc. of multi-layer moldings with polyolefin resins. This is due to a low compatibility between polyolefin resins and polyamides. Since the impact resistance is a particularly important property for the fuel tanks, its decrease greatly reduces the values of the fuel tanks. Although a high impact resistance can be maintained if flashes, defective moldings, etc. are not added as regenerated products, the cost reduction of materials for the fuel tanks cannot be achieved.

In addition, when flashes, defective moldings, etc. generated in the production of multi-layer plastic fuel tanks are blended with a virgin polyolefin resin, the resin temperature should be set at 230°–250° C. to improve the dispersibility of polyamide. In this case, there is remarkable decrease in drawdown resistance of the parison.

OBJECT AND SUMMARY OF THE INVENTION

Accordingly, an object of the present invention is to provide a multi-layer plastic fuel tank having at least one high-density polyethylene layer and at least one polyamide layer, the high-density polyethylene layer and the polyamide layer being strongly bonded to each other, which tank has sufficient gas barrier properties and impact resistance as well as improved drawdown resistance.

Another object of the present invention is to provide a method of producing a multi-layer plastic fuel tank having an excellent impact resistance by reusing flashes, defective moldings, etc. of multi-layer plastic fuel tanks and mixing them with high-density polyethylene.

As a result of intense research in view of the above object, the inventors have found that by forming the polyamide layer by a polyamide 6/polyamide 66 copolymer, it is possible to produce a multi-layer plastic fuel tank even at a low resin temperature of the high-density polyethylene layer in the course of extrusion, thereby improving the drawdown resistance of the multi-layer plastic fuel tank. The inventors have also found that by blending high-density polyethylene with flashes, defective moldings, etc. of multi-layer plastic fuel tanks by using an extruder equipped with a screw having a special structure, the resulting composition can have fine polyamide particles uniformly dispersed therein, and that this composition can be used as a high-density polyethylene composition for the high-density polyethylene layer of a multi-layer plastic fuel tank to improve its various properties. The present invention is based on these findings.

Thus, the multi-layer plastic fuel tank according to the present invention comprises at least one high-density polyethylene layer, at least one polyamide layer, and at least one modified high-density polyethylene layer made of high-density polyethylene modified with an unsaturated carboxylic acid or its derivatives, which is interposed between each high-density polyethylene layer and each polyamide layer for bonding them, the polyamide layer being made of a polyamide copolymer comprising 90–60 weight % of polyamide 6 and 10–40 weight % of polyamide 66.

The method of producing a multi-layer plastic fuel tank according to the present invention comprises a high-density polyethylene layer, a modified high-density polyethylene layer, a polyamide layer, a modified high-density polyethylene layer and a high-density polyethylene layer according to the present invention comprises the step of forming the high-density polyethylene layer form a composition obtained by blending 20–200 parts by weight of part or whole of the multi-layer plastic fuel tank as a regenerated product with 100 parts by weight of virgin high-density polyethylene, wherein the blending is carried out at an extrusion temperature of 200°–250° C. by using a single-screw extruder having an L/D ratio of 20 or more and provided with a screw constituted by a feed portion, a metering portion for metering an extrusion rate, a cross-saw portion for applying a lateral shearing force to a resin flow thereby conducting the blending of the resin, a deep-screw channel portion in which the resin resides, a high-shear portion and an end portion having mixing pins in this order from the hopper side.

DETAILED DESCRIPTION OF THE INVENTION

1. Multi-Layer Plastic Fuel Tank

Figure 1:
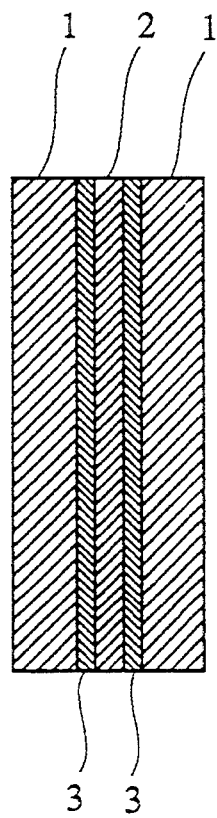
FIG. 1 is a partial cross-sectional view showing one example of a multi-layer structure of the multi-layer plastic fuel tank according to the present invention.

The multi-layer plastic fuel tank is constituted by three types of layers: a high-density polyethylene layer, a polyamide layer and a modified high-density polyethylene layer (made of high-density polyethylene modified with unsaturated carboxylic acid or its derivatives).

A. High-Density Polyethylene Layer

High-density polyethylene forming the high-density polyethylene layer has a density of 0.935 g/cm$^3$ or more, and preferably has a melt index (MI, 190° C., 2.16 kg load) of 0.003–2 g/10 minutes from the aspects of a drawdown resistance, a moldability and an impact resistance. The more preferred melt index is 0.01–1 g/10 minutes. Incidentally, when the flowability of the high-density polyethylene is expressed by a high-load melt index (HLMI, 190° C., 21.6 kg load), it is preferably 70 g/10 minutes or less, more preferably 1–20 g/10 minutes.

B. Polyamide Layer (a) General Polyamide

Polyamides forming the polyamide layer are polymers containing amide bonds (—CONH—), and they may be produced by (1) a ring-opening polymerization of lactams; (2) a condensation polymerization of amino carboxylic acids; (3) a condensation polymerization of diamines and dibasic acids, etc. Their examples include polyamide resins formed from aliphatic, alicyclic or aromatic diamines such as hexamethylenediamine, decamethylenediamine, dodecamethylenediamine, 2,2,4- or 2,4,4-trimethylhexamethylenediamine, 1,3- or 1,4-bis (aminomethyl) cyclohexane, bis (p-aminocyclohexylmethane), m- or p-xylylenediamine, etc., and aliphatic, alicyclic or aromatic dicarboxylic acids such as adipic acid, suberic acid, sebacic acid, cyclohexane dicarboxylic acid, terephthalic acid, isophthalic acid, etc.; polyamide resins formed from amino carboxylic acids such as 6-amino caproic acid, 11-amino undecanoic acid, 12-amino dodecanoic acid, etc.; polyamide resins formed from lactams such as ε-caprolactam, ω-dodecalactam, etc.; copolymers made of these components; and mixtures of these polyamide resins. Specifically, the polyamide resins may be polyamide 6, polyamide 66, polyamide 11, polyamide 12 and copolymers consisting of these nylons. Besides, copolymers comprising 50 weight % or more of these polyamide resins and other resins may also be used.

The weight-average molecular weight (Mw) of the polyamide is preferably 3,000–200,000, more preferably 10,000–100,000.

To improve the impact resistance, the polyamide may contain 5–30 weight % of a plasticizer such as ε-caprolactam, N-butylbenzene sulfonamide, octyl paraoxybenzoate, etc. The preferred amount of the plasticizer is 10–20 weight %.

(b) Preferred Polyamide

In the preferred embodiment, the polyamide layer is made of a polyamide copolymer comprising polyamide 6 and polyamide 66 (polyamide 6–66).

The polyamide 6 is generally represented by the following formula (1):

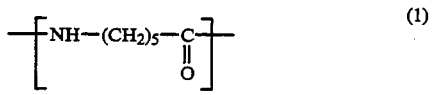

The polyamide 66 is generally represented by the following formula (2):

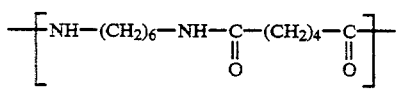
(2)

The content of the polyamide 6 is 60–90 weight %, preferably 70–80 weight %, and the content of the polyamide 66 is 40–10 weight %, preferably 30–20 weight % in the polyamide copolymer. When the content of the polyamide 6 is lower than 60 weight % (when the content of the polyamide 66 exceeds 40 weight %), the multi-layer plastic fuel tank shows poor gas barrier properties. On the other hand, when the content of the polyamide 6 exceeds 90 weight % (when the content of the polyamide 66 is lower than 10 weight %), the multi-layer plastic fuel tank does not show an improved impact resistance.

The above polyamide 6–66 can be produced, for instance, by copolymerizing hexamethylene diamine and adipic acid in the presence of ε-caprolactam.

The polyamide 6–66 has a relative viscosity (JIS K6810) of 3–6.5, particularly 4–6.

(c) Polyamide 6–66 Blended With Modified Olefinic Elastomer

In the further preferred embodiment of the present invention, the polyamide 6–66 may be blended with a modified olefinic elastomer.

The modified olefinic elastomer is an olefinic elastomer modified with an unsaturated carboxylic acid or its derivatives. The unsaturated carboxylic acid or its derivatives are monocarboxylic acids such as acrylic acid, methacrylic acid, etc.; dicarboxylic acids such as maleic acid, fumaric acid, itaconic acid, etc.; dicarboxylic anhydrides such as maleic anhydride, itaconic anhydride, endomethylenetetrahydrophthalic anhydride (hymic anhydride), etc., and particularly maleic anhydride and endomethylenetetrahydrophthalic anhydride are preferable.

The olefinic elastomers to be modified with graft monomers are copolymer rubbers comprising two or more α-olefins comprising ethylene, propylene, 1-butene, 1-hexene, 4-methyl-1-pentene, etc. Among them, an ethylene-propylene copolymer rubber (EPR) and an ethylene-butene copolymer rubber (EBR) are particularly preferable.

The ethylene-propylene copolymer rubber (EPR) used in the present invention preferably comprises 10–90 mol % of ethylene, and 90–10 mol % of propylene. The more preferred range is 20–80 mol % for the ethylene and 80–20 mol % for the propylene. The ethylene-propylene copolymer rubber (EPR) has a Mooney viscosity $ML_{1+4}$ (100° C.) of 1–120, preferably 5–100.

The ethylene-butene copolymer rubber (EBR) used in the present invention preferably comprises 10–90 mol % of ethylene, and 90–10 mol % of butene. The more preferred range is 20–80 mol % for the ethylene and 80–20 mol % for the butene. The ethylene-butene copolymer rubber (EBR) has a Mooney viscosity $ML_{1+4}$ (100° C.) of 1–120, preferably 5–100.

The ethylene-propylene copolymer rubber (EPR) and the ethylene-butene copolymer rubber (EBR) may further contain other α-olefins such as 4-methyl-1-pentene, etc. in such an amount that they do not deteriorate the properties of EPR or EBR.

The proportion of the unsaturated carboxylic acid or its derivatives in the modified olefinic elastomer is $1.0 \times 10^{-5}$ to $6.0 \times 10^{-5}$ mol/g, preferably $2.0 \times 10^{-5}$ to $5.0 \times 10^{-5}$ mol/g. Specifically, in the case of maleic anhydride, its content is 0.005–5 weight %, preferably 0.01–3 weight %, and in the case of hymic anhydride (endomethylenetetrahydrophthalic anhydride), its content is 0.015–4 weight %, preferably 0.15–1.5 weight %. If the amounts of maleic anhydride and hymic anhydride are smaller than the lower limits of the above ranges, sufficient compatibility of the modified olefinic elastomer with polyamide cannot be achieved. On the other hand, if their amounts exceed the upper limits of the above ranges, the modified olefinic elastomer cannot be sufficiently dispersed in the polyamide.

Such modified olefinic elastomers can be produced by a solution method or a melt blending method.

The modified olefinic elastomer is blended with the polyamide 6–66 preferably in an amount of 30 weight % or less based on 100 weight % of the polyamide 6–66 + the modified olefinic elastomer. When the amount of the modified olefinic elastomer exceeds 30 weight %, the multi-layer plastic fuel tank shows reduced gas barrier properties.

C. Modified High-Density Polyethylene Layer

Modified high-density polyethylene forming the modified high-density polyethylene layer is high-density polyethylene modified with an unsaturated carboxylic acid or its derivatives. The unsaturated carboxylic acid or its derivatives may be the same as used for modifying the olefinic elastomer. The high-density polyethylene to be modified with the unsaturated carboxylic acid or its derivatives may be the same as used for the high-density polyethylene layer.

The proportion of the unsaturated carboxylic acid or its derivatives in the modified high-density polyethylene layer is preferably 0.005–5 weight %. Specifically, in the case of maleic anhydride, its content is preferably 0.01–3 weight %, more preferably 0.1–1 weight %, and in the case of hymic anhydride (endomethylenetetrahydrophthalic anhydride), its content is 0.015–4 weight %, more preferably 0.15–1.5 weight %. If the amounts of maleic anhydride and hymic anhydride are smaller than the lower limits of the above preferred ranges, sufficient bonding cannot be achieved between the polyamide layer and the modified high-density polyethylene layer. On the other hand, if their amounts exceed the upper limits of the above preferred ranges, a bonding strength decreases between the modified high-density polyethylene layer and the high-density polyethylene layer.

Such modified high-density polyethylene can be produced by a solution method or a melt blending method.

Incidentally, each of the above layers may contain other additives such as fillers, thermostabilizers, antioxidants, photostabilizers, flame retarders, plasticizers, anti-static agents, parting agents, foaming agents, nucleating agents, etc. to improve their properties.

D. Multi-Layer Structure

The multi-layer plastic fuel tank made of the above resins has a multi-layer structure in which adjacent high-density polyethylene layer and polyamide layer are bonded to each other via a modified high-density polyethylene layer. A typical example of such multi-layer structure is shown in FIG. 1, which comprises outer and inner high-density polyethylene layers 1, 1, a central polyamide layer 2 and intermediate modified high-density polyethylene layers 3, 3 for bonding adjacent high-density polyethylene layer 1 and polyamide layer 2.

The thickness proportions of the two high-density polyethylene layers 1, 1, the two modified high-density polyethylene layers 3, 3 and the polyamide layer 2 are preferably 99-60:0.5-20:0.5-20. When the total thickness of the two high-density polyethylene layers is smaller than 60% of the thickness of the multi-layer plastic fuel tank, the multi-layer plastic fuel tank does not have a sufficient strength. When the polyamide layer is thinner than 0.5% of the thickness of the multi-layer plastic fuel tank, the fuel tank does not have sufficient gas barrier properties. And when each modified high-density polyethylene layer is thinner than 0.25% (0.5%×½) of the thickness of the multi-layer plastic fuel tank, a sufficient bonding strength cannot be achieved between the high-density polyethylene layer and the polyamide layer.

The thickness of each layer of the multi-layer plastic fuel tank may be determined depending upon the impact resistance and gas barrier properties required as the fuel tank. Specifically, in the case of a gasoline tank, the high-density polyethylene layer has a thickness of 1.5-5 mm, the polyamide layer has a thickness of 20-500 μm, and the modified high-density polyethylene layer has a thickness of 20-500 μm. Incidentally, if there are two or more layers in each category of the layers, it should be noted that the above thickness means a total thickness.

E. Reuse of Regenerated Product for High-Density Polyethylene Layer

In the present invention, part or whole of the multi-layer plastic fuel tank is reused as a regenerated high-density polyethylene composition for the high-density polyethylene layer.

A proportion of the regenerated product (obtained from part or whole of the multi-layer plastic fuel tank) to be blended with virgin high-density polyethylene may differ depending upon the thickness of each layer, but it is generally 20-200 parts by weight per 100 parts by weight of the virgin high-density polyethylene. When the proportion of the regenerated product is lower than 20 parts by weight, sufficient cost reduction by using the regenerated product cannot be achieved. On the other hand, when it exceeds 200 parts by weight, the percentage of polyamide is too high in the high-density polyethylene layer, resulting in the decrease in an impact resistance, etc. The preferred proportion of the regenerated product in the high-density polyethylene layer is 20-150 parts by weight.

2. Production of Multi-Layer Plastic Fuel Tank by Using Single-Screw Extruder The multi-layer plastic fuel tank can be produced, for instance, by extruding a resin for each layer from an extruder, forming a cylindrical parison having the above layer structure by a usual co-extrusion method, setting this parison in a blow molding die cavity having a desired shape and subjecting it to blow molding.

(a) In the Case of Using Polyamide 6-66

In the process of extruding a parison, the extrusion temperature of the high-density polyethylene layer as a main layer is lower than the usual extrusion temperature. Namely, although the extrusion temperature of high-density polyethylene is usually 230°-250° C., the extrusion temperature of the high-density polyethylene layer is determined within the range of 200°-230° C., by the melting temperature of the polyamide 6-66. For instance, in a case where a weight ratio of the polyamide 6 (a) to the polyamide 66 (b) is 90:10, the resin for the high-density polyethylene layer is extruded at 220°-230° C. In the case of (a)/(b)=70:30, the extrusion temperature is 210°-220° C. Also, in the case of (a)/(b)=60:40, the extrusion temperature is 200°-210° C. This low extrusion temperature serves not only to prevent the drawdown of a parison but also to shorten a molding cycle time.

In this embodiment, since the polyamide layer of the multi-layer plastic fuel tank is made of the polyamide 6-66, the resin temperature of the high-density polyethylene can be reduced in the formation of its parison. As a result, the drawdown of the parison can be prevented. The reason therefor is not necessarily clear, but it may be presumed that since the polyamide 6-66 has lower melting point and crystallization temperature, and better heat resistance, a moldability, etc. as compared with polyamide 6 as a homopolymer, the co-extrusion of the polyamide 6-66, the high-density polyethylene and the modified high-density polyethylene can be conducted at a lower temperature.

(b) Single-Screw Extruder

Figure 2:
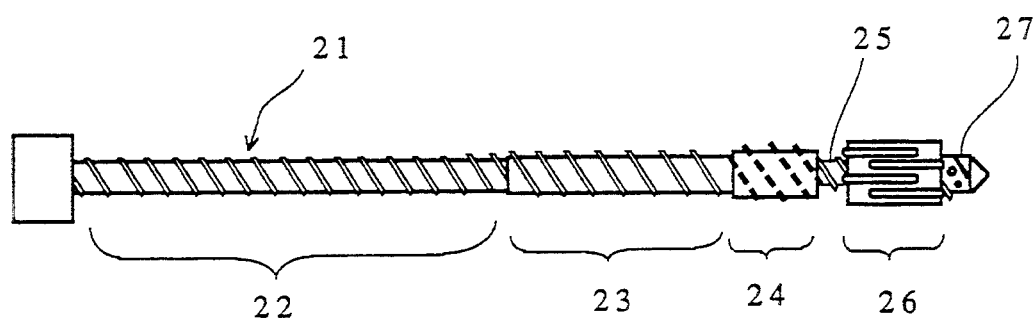
FIG. 2 is a schematic view showing one example of a screw in a single-screw extruder used for the blending of resins for the high-density polyethylene layer in the method of the present invention.

In the method according to the preferred embodiment of the present invention, a single-screw extruder having an L/D ratio of 20 or more and provided with a screw constituted by a feed portion, a metering portion for metering an extrusion rate, a cross-saw portion for applying a lateral shearing force to a resin flow thereby conducting the blending of the resin, a deep-screw channel portion in which the resin resides, a high-shear portion and an end portion having mixing pins in this order from the hopper side is used. FIG. 2 schematically shows one example of such an extruder.

In FIG. 2, a screw 21 provided with a spiral flight has a feed portion 22, a metering portion 23, a cross-saw portion 24, a deep-screw channel portion 25, a high-shear portion 26 and an end portion 27 provided with mixing pins in this order from the hopper side.

The length of the screw 21 is conveniently expressed by a length/diameter (L/D) ratio. The L/D ratio of the screw 21 is generally 20 or more. When it is less than 20, sufficient blending cannot be conducted. The upper limit of the L/D ratio is not particularly restricted, but it is preferably about 4.0.

Figure 3:
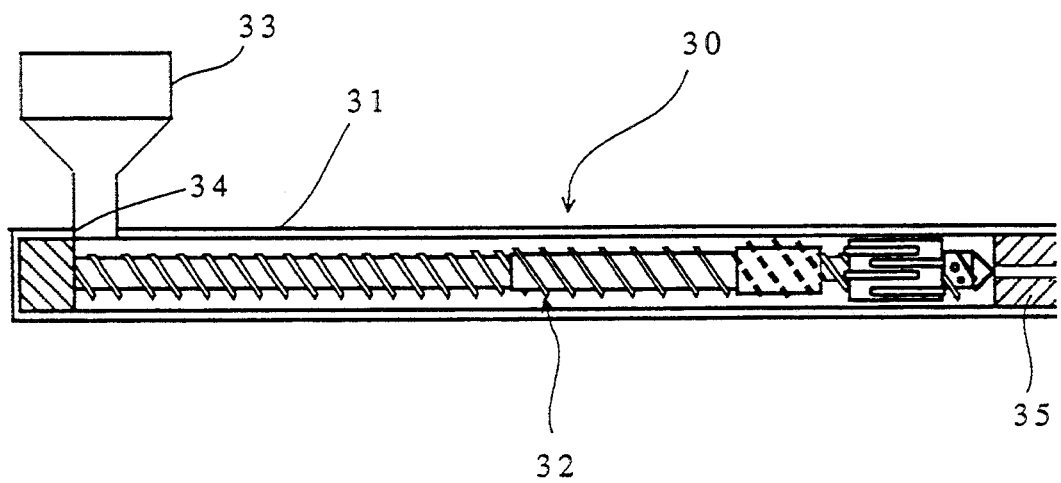
FIG. 3 is a partially cross-sectional view showing one example of the extruder used for the blending of resins for the high-density polyethylene layer in the method of the present invention.

The single-screw extruder having the above-described screw has a structure shown, for instance, by FIG. 3. In FIG. 3, the extruder 30 comprises a cylinder 31, a screw 32 having a spiral flight on its outer surface and rotatably disposed inside the cylinder 31 concentrically therewith, a hopper 33 for supplying a thermoplastic resin, an opening 34 positioned in a side wall of the cylinder 31 near its front end and communicating with the hopper 33 for receiving the thermoplastic resin from the hopper 33, and an extrusion mechanism 35 mounted to the cylinder 31 at a downstream end thereof.

In such an extruder, a resin mixture based on high-density polyethylene supplied from the hopper 33 passes through the opening 34 and is fed through the extruder 30 by the screw 32. During passing through the cylinder 31, the resin mixture is melt-blended until it reaches the extrusion mechanism 35. The melt blending is well conducted by the screw 32 constituted by the above-described portions. The melt blending mechanism of the high-density polyethylene-based resin composition by various portions of the screw 32 will be explained below along the flow of the resin mixture.

(1) Feed portion 22

In the feed portion 22, the screw is provided with a spiral flight and functions to conduct a first-stage melt blending while gradually compressing the resin mixture. The feed portion 22 is not restricted to a particular shape, but may have any shape which is usually used.

Such a feed portion has a length (expressed by an L/D ratio) of 10 or more, particularly 12–16. When the L/D ratio is lower than 10, it is difficult to achieve sufficient melt blending of the resin mixture, and the resin mixture cannot be compressed to have a sufficiently large apparent density.

(2) Metering portion 23

The screw 32 is also provided with a spiral flight in this portion, to blend the resin mixture homogeneously and to meter an extrusion rate of the resin supplied from the feed portion 22 per 1 cycle of the screw 32. The metering portion 23 is not restricted to a particular shape, but may have any shape which is used usually. Since the screw shaft has a larger diameter in the metering portion 22 than in the feed portion 22, the height of the spiral flight is smaller in the metering portion 23 than in the feed portion 22.

The L/D ratio of the metering portion 23 is preferably 4 or more, particularly 4–6. When the L/D) ratio is lower than 4, it is difficult to perform the above-described function.

(3) Cross-saw portion 24

The cross-saw portion 24 is a portion in which the resin is subjected to a melt blending action in a lateral direction. This portion is necessary because the melt blending of the resin in the feed portion 22 and the metering portion 23 is insufficient as far as the lateral melt blending action is concerned. For achieving the lateral melt blending action, the screw shaft has a slightly larger outer diameter, and flight channels are provided with pins, etc., or the spiral flight is notched at a constant interval. One example of the cross-saw portion 24 is shown in FIG. 4.

Figure 4:
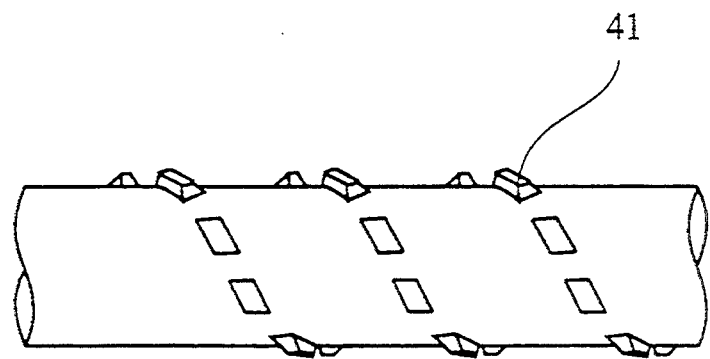
FIG. 4 is a schematic view showing one example of a cross-saw portion of the extruder.

In FIG. 4, the spiral flight of the screw is notched at a constant interval. By these notches 41, the resin mixture is subjected to much stronger melt blending in a lateral direction than in a case where a usual spiral flight without notches is used.

By conducting melt blending in a lateral direction, polyamide particles can be dispersed finely to produce a homogeneous composition, and a uniform temperature distribution can be achieved in the resin mixture.

The L/D ratio of the cross-saw portion 24 is preferably 1 or more, particularly 1–2. When it is lower than 1, it is difficult to achieve the above-described function sufficiently.

(4) Deep-screw channel portion 25

The resin heated in the metering portion 23 and the cross-saw portion 24 is caused to reside in the deep-screw channel portion 25 temporarily, and is cooled by a cylinder barrel of the extruder. Accordingly, the screw shaft has a smaller diameter in the deep-screw channel portion 25.

The L/D ratio of the deep-screw channel portion 25 is preferably 0.5 or more, particularly 1–2. When it is lower than 0.5, it is difficult to achieve the above-described function sufficiently.

(5) High-shear portion 26

The high-shear portion 26 is a portion in which the resin which has passed through the feed portion 22, the metering portion 23, the cross-saw portion 24 and the deep-screw channel portion 25 is subjected to intense shearing, so that unmolten resin portions, if any, are homogeneously blended with the other molten portion of the resin.

The high-shear portion 26 is not restricted to a particular shape, and may be a ring type, a torpedo type, a MADDOCK type, etc. Among them, the MADDOCK type is most preferable. To apply a large shearing force and a high heat energy to the resin, there should be as small a gap as possible between an inner wall of the cylinder 31 and the high-shear portion 26. Thus, the screw shaft has a larger diameter than any other portions of the screw 32. One example of such a high-shear portion (MADDOCK type) is shown in FIG. 5.

Figure 5:
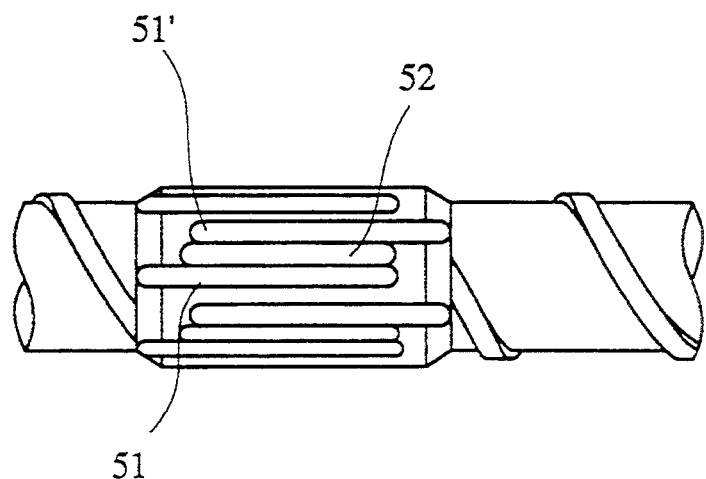
FIG. 5 is a schematic view showing one example of a high-shear portion of the extruder.

In FIG. 5, the screw shaft has a larger diameter in the high-shear portion 26. Pairs of longitudinal grooves 51, 51' are provided, and adjacent longitudinal grooves 51, 51' are communicated with each other via each groove 52.

The resin composition enter into the longitudinal groove 51, and passes through the longitudinal groove 51' via the communicating groove 52. In this case, since the screw diameter is larger in the high-shear portion 26, the resin is given a large shearing force and a high heat energy, so that unmolten resin portions are melted and blended with the other portion (molten portion) of the resin to produce a homogeneous blend.

The L/D ratio of the high-shear portion 26 is preferably 2 or more, particularly 2–4. When it is lower than 2, it is difficult to achieve the above-described function sufficiently.

(6) End portion 27 having mixing pins

In the end portion 27, the resin whose unmolten resin portions are melted in the high-shear portion 26 is blended in both longitudinal and transverse directions to produce a homogeneous mixture.

Figure 6:
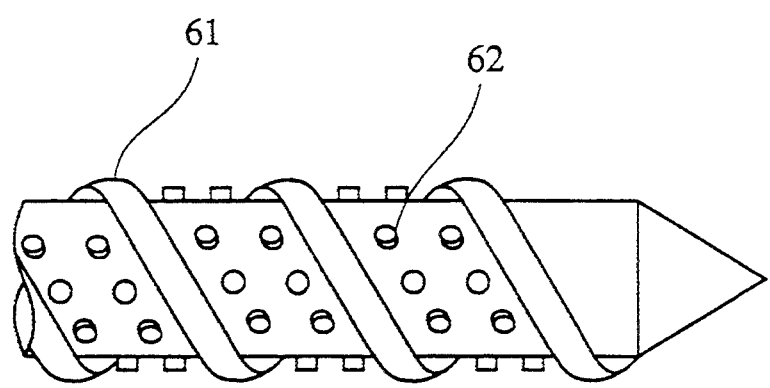
FIG. 6 is a schematic view showing one example of an end portion (mixing portion) of the extruder having mixing pins.

One example of the end portion 27 is shown in FIG. 6. In FIG. 6, the screw is provided with a spiral flight 61 and mixing pins 62 in a screw channel. By these mixing pins 62, the resin mixture based on high-density polyethylene is subjected to larger melt blending in a lateral direction than in a case where the screw has a usual spiral flight without mixing pins.

By strongly blending the resin in both longitudinal and lateral directions by the end portion 27, a homogeneous molten resin is obtained with a uniform temperature distribution, and fed to an extrusion mechanism 35.

The L/D ratio of the end portion 27 is preferably 1 or more, particularly 1–2. When it is lower than 1, it is difficult to achieve the above-described function sufficiently.

Incidentally, the extrusion mechanism 35 is usually communicated with a blow molding machine. In the present invention, a blow molding machine having a mandrel for producing a parison for multi-layer moldings by co-extrusion is preferably fixed to the extrusion mechanism 35.

In the extruder provided with the screw having such a structure, the cylinder temperature is appropriately controlled within the range of 170°–250° C. Specifically, the feed portion 22, the metering portion 23, the cross-saw portion 24, the deep-screw channel portion 25 and the high-shear portion 26 are controlled at 170°–200° C., and the end portion 27 is controlled at 200°–240° C.

The extrusion rate of the resin blended by such an extruder can be appropriately determined depending upon the size of the extruder. For instance, in the case of an extruder having a cylinder inner diameter of 90 mm, the extrusion rate is preferably about 150–200 kg/hr. When the extrusion rate of the resin is too high, the time period during which the resin resides in the extruder is short, resulting in insufficient blending.

In a composition for the high-density polyethylene layer obtained by blending by means of the above-described extruder, the dispersed polyamide particles have as small an average particle size as 10 μm or less.

In a case where flashes, defective moldings, etc. generated in the blow molding of parisons for multi-layer plastic fuel tanks are blended with virgin high-density polyethylene for the high-density polyethylene layer of the multi-layer plastic fuel tank, good dispersion of polyamide in the high-density polyethylene matrix can be achieved at a lower melt blending temperature than the conventional one, because the polyamide 6–66 has a lower melting point than that of the polyamide 6.

Accordingly, the multi-layer plastic fuel tank thus obtained, whose high-density polyethylene layer is made of a composition containing flashes, defective moldings, etc. generated in the production of the multi-layer plastic fuel tanks, shows properties such as impact resistance, etc., which are only little deteriorated, if any.

In this embodiment, part or whole of the multi-layer plastic fuel tank is mixed with virgin high-density polyethylene, and the resulting mixture is melt-blended by an extruder having the above-described structure and reused for the high-density polyethylene layer of the multi-layer plastic fuel tank. The multi-layer plastic fuel tank obtained from such regenerated product does not suffer from the deterioration of properties such as impact resistance, etc. This is due to the fact that fine particles of polyamide can be well dispersed in a composition for the high-density polyethylene layer by synergistic effects of each portion of the extruder used in the present invention, in which the virgin high-density polyethylene and the regenerated product are blended in the feed portion, metered in the metering portion, subjected to melt blending in the direction lateral to the resin flow in the cross-saw portion, and then subjected to melting of the unmolten resin portions and blending in the high-shear portion in both longitudinal and lateral directions.

The present invention will be explained in further detail by way of the following Examples. Incidentally, starting materials (high-density polyethylene, modified high-density polyethylene, modified olefinic elastomer and polyamide) used are as follows:

1. High-density polyethylene
   HDPE [Melt index (MI, 190° C., 2.16 kg load): 0.03 g/10 minutes, high-load melt index (HLMI, 190° C., 21.6 kg load): 5.5 g/10 minutes, density: 0.945 g/m³, weight-average molecular weight (Mw): 20×10⁴]
2. Modified high-density polyethylene
   CMPE [Melt index (MI, 190° C., 2.16 kg load): 0.3 g/10 minutes, maleic anhydride graft ratio: 0.4 weight %, density: 0.953 g/m³, weight-average molecular weight (Mw): 12×10⁴]
3. Modified olefinic elastomer
   CMEBR Modified ethylene-butene copolymer rubber [ethylene-butene copolymer rubber (ethylene content: 50 weight %) grafted with 0.4 weight % of maleic anhydride, melt index (MI, 190° C., 2.16 kg load): 0.3 g/10 minutes]
4. Polyamide
   (1) Polyamide 6
     PA-1 [Nylon 6, relative viscosity: 4]
     PA-2 [Nylon 6, relative viscosity: 4.2]
     PA-3 [Nylon 6, relative viscosity: 6.0]
   (2) Polyamide 6–66
     CPA-1 [Nylon 6: Polyamide 66=90:10, relative viscosity: 4]
     CPA-2 [Nylon 6: Polyamide 66=70:30, relative viscosity: 4]
     CPA-3 [Nylon 6: Polyamide 66=50:50, relative viscosity: 4]
     CPA-4 [Nylon 6: Polyamide 66=96:4, relative viscosity: 4]
   (3) Polyamide 6–12
     CPA-5 [Nylon 6 :Polyamide 12=70:30, relative viscosity: 4]
   (4) Polyamide 6–66/modified olefinic elastomer
     CPA-B1 [Blend of CPA-2 and CMEBR, CPA-2:CMEBR=90:10]
     CPA-B2 [Blend of CPA-2 and CMEBR, CPA-2:CMEBR=70:30]

The resin based on high-density polyethylene was melt-blended by the following single-screw extruder (cylinder diameter: 90 mm):

(a) L/D=30, special screw having a structure shown in FIG. 2.
(b) L/D=32, special screw having a structure shown in FIG. 2.
(c) L/D=24, special screw having a structure shown in FIG. 2.
(d) L/D=28, special screw having a structure shown in FIG. 2.
(e) L/D=24, full-flighted screw having a structure shown in FIG. 2.
(f) L/D=28, full-flighted screw having a structure shown in FIG. 2.

Examples 1–4, Comparative Examples 1–4

Production of Multi-Layer Plastic Fuel Tank

A multi-layer plastic fuel tank (capacity: 40 liter) of a 3-type, 5-layer structure as shown in Table 1 was produced from high-density polyethylene, modified high-density polyethylene and various polyamides listed in Table 2 at a temperature shown in Table 2 by using a multi-layer blow molding machine (NB-60G, manufactured by The Japan Steel Works, Ltd.).

TABLE 1

| Layer | Type of Resin | Thickness (mm) |
| --- | --- | --- |
| Outer Layer | HDPE | 2.6 |
| Bonding Layer | CMPE | 0.1 |
| Barrier Layer | PA | 0.1 |
| Bonding Layer | CMPE | 0.1 |
| Outer Layer | HDPE | 2.6 |

In the course of producing a parison, its drawdown was observed. And each of the resulting fuel tanks was measured with respect to a thickness distribution (minimum thickness), and subjected to a drop impact test at −40° C. and a gasoline permeability test at 40° C. The molding cycle time of the fuel tank was also measured. The results are shown in Table 2.

TABLE 2

|  | Example No. | | | |
| --- | --- | --- | --- | --- |
|  | 1 | 2 | 3 | 4 |

TABLE 2-continued

| Production Conditions | | | | |
|---|---|---|---|---|
| Polyamide | CPA-1 | CPA-2 | CPA-B1 | CPA-B2 |
| Blending Temperature of HDPE (°C.) | 220–230 | 210–220 | 220–230 | 210–220 |
| Properties of Parison | | | | |
| Drawdown of Parison[1] | ◯ | ◯ | ◯ | ◯ |
| Minimum Thickness (mm) | 3.5 | 3.5 | 3.5 | 3.5 |
| Properties of Fuel Tank | | | | |
| Drop Impact Resistance[2] | ◯ | ◯ | ◯ | ◯ |
| Gasoline Barrier Property[3] | ◯ | ◯ | ◯ | ◯ |
| Cycle Time (minutes) | 3 | 2.5 < t < 3 | 3 | 2.5 < t < 3 |

| | Comparative Example No. | | | |
|---|---|---|---|---|
| | 1 | 2 | 3 | 4 |
| Production Conditions | | | | |
| Polyamide | PA-1 | CPA-3 | CPA-4 | CPA-5 |
| Blending Temperature of HDPE (°C.) | 230–250 | 190–200 | 220–230 | 230–250 |
| Properties of Parison | | | | |
| Drawdown of Parison[1] | X | ◯ | ◯ | X |
| Minimum Thickness (mm) | 2.5 | 3.5 | 3.5 | 2.5 |
| Properties of Fuel Tank | | | | |
| Drop Impact Resistance[2] | X | ◯ | X | X |
| Gasoline Barrier Property[3] | ◯ | X | ◯ | X |
| Cycle Time (minutes) | 3 < t < 3.5 | 2 < t < 2.5 | 3 | 3 < t < 3.5 |

Note
[1]Evaluation
◯: Drawdown was 5 cm or less until the mold was closed after the extrusion of the parison.
△: Drawdown was higher than 5 cm and 10 cm or less until the mold was closed after the extrusion of the parison.
X: Drawdown was higher than 10 cm until the mold was closed after the extrusion of the parison.
[2]Measured by dropping the multi-layer plastic fuel tank filled with a mixed liquid (−40° C.) of water and ethylene glycol having the same weight as that of gasoline filling the fuel tank from a height of 6 m. Evaluation was as follows:
◯: No break.
X: Broken.
[3]Measured according to ECE 34. Evaluation was as follows:
◯: Gasoline permeability was 20 g/day or less.
X: Gasoline permeability exceeded 20 g/day.

As is clear from Table 2, the multi-layer plastic fuel tanks of Examples 1–5 whose polyamide layers were made of the nylon 6–66 are excellent in a drawdown resistance, a minimum thickness, an impact resistance and gas barrier properties. On the other hand, the multi-layer plastic fuel tank of Comparative Example 1 whose polyamide layer was made of nylon 6, and the multi-layer plastic fuel tank of Comparative Example 4 whose polyamide layer was made of nylon 6–12 are poor in a drawdown resistance. Also, that of Comparative Example 2 shows poor gas barrier properties, and that of Comparative Example 3 shows an insufficient impact resistance. Incidentally, as the drawdown becomes smaller, the minimum thickness becomes larger. In this sense, the minimum thickness is a parameter showing the moldability (drawdown resistance) of the parison.

Examples 5–8

Evaluation of Extrudability of Mixture of Pulverized Multi-Layer Plastic Fuel Tank and Virgin High-Density Polyethylene A multi-layer plastic fuel tank (capacity: 40 liter) of a 3-type, 5-layer structure as shown in Table 1 was produced from high-density polyethylene, modified high-density polyethylene and various polyamides shown in Table 3 at a temperature shown in Table 3 by using a multi-layer blow molding machine (NB-60G, manufactured by The Japan Steel Works, Ltd.). The resulting multi-layer plastic fuel tank was pulverized by a crusher having a punching plate diameter of 8 mm.

The pulverized multi-layer plastic fuel tank and high-density polyethylene (virgin resin) were dry-blended at a weight ratio of 50:50 to produce a resin mixture. The resin mixture was melt-blended at a temperature shown in Table 3 to produce a single-layer parison.

With respect to the parison thus obtained, a particle size of polyamide particles was measured. The dispersibility of polyamide particles was evaluated as "◯" when the polyamide particles had a particle size of 10 μm or less., and "X" when the polyamide particles had a particle size exceeding 10 μm. The results are shown in Table 3 together with the type of polyamide used.

The parisons were further measured with respect to a tensile elongation and a tensile impact strength at −40° C. according to a tensile test method (ASTM D638) and a tensile impact test (ASTM D1822), respectively. The measured values of these properties were compared with those of parisons produced from virgin resins under the same conditions as above. The results are shown in Table 3.

TABLE 3

| | Example No. | | | |
|---|---|---|---|---|
| Production Conditions | 5 | 6 | 7 | 8 |
| Polyamide | CPA-1 | CPA-2 | CPA-B1 | CPA-B2 |
| Blending Temperature (°C.) | 220–230 | 210–230 | 220–230 | 210–230 |
| Particle Size of Polyamide (μm) | 1–2 | 1–2 | 1–2 | 1–2 |
| Dispersibility of Polyamide | ◯ | ◯ | ◯ | ◯ |
| Tensile Elongation* (%) | 100 | 100 | 100 | 100 |

Note *: Expressed as a percentage relative to the tensile elongation of a virgin HDPE (containing no polyamide).

It is clear from Table 3 that when the pulverized multi-layer plastic fuel tank is blended with virgin high-density polyethylene, good dispersion of polyamide particles can be obtained even at a low temperature.

Accordingly, the resulting high-density polyethylene composition does not suffer from decrease in tensile properties as compared with the virgin high-density polyethylene.

Examples 9-12

Production of Multi-Layer Plastic Fuel Tank

A multi-layer plastic fuel tank (capacity: 40 liter) of a 3-type, 5-layer structure as shown in Table 1 was produced from a resin mixture obtained in Examples 5-8 as high-density polyethylene, modified high-density polyethylene and various polyamides listed in Table 4 at a temperature shown in Table 4 by using a multi-layer blow molding machine (NB-60G, manufactured by The Japan Steel Works, Ltd.).

In the course of producing a parison, its drawdown was observed. And each of the resulting fuel tanks was measured with respect to a thickness distribution (minimum thickness), and subjected to a drop impact test at $-40°$ C. and a gasoline permeability test at 40° C. The molding cycle time of the fuel tank was also measured. The results are shown in Table 4.

TABLE 4

| | Example No. | | | |
|---|---|---|---|---|
| | 9 | 10 | 11 | 12 |
| Production Conditions of Multi-Layered Plastic Fuel Tank | | | | |
| Polyamide | CPA-1 | CPA-2 | CPA-B1 | CPA-B2 |
| Blending Temperature of HDPE (°C.) | 220-230 | 210-230 | 220-230 | 210-230 |
| Properties of Parison | | | | |
| Minimum Thickness (mm)[1] | 3.5 | 3.5 | 3.5 | 3.5 |
| Drawdown Properties of Multi-Layered Plastic Fuel Tank | ◯ | ◯ | ◯ | ◯ |
| Drop Impact Resistance[2] | ◯ | ◯ | ◯ | ◯ |
| Gasoline Barrier Property[3] | ◯ | ◯ | ◯ | ◯ |
| Cycle Time (Minutes) | 3 | 3 | 3 | 3 |

The multi-layer plastic fuel tanks of Examples 9-12 whose high-density polyethylene layers were made of compositions consisting of the above pulverized tanks and virgin high-density polyethylene were excellent in all of the drawdown resistance, the thickness distribution, the impact resistance and the gas barrier properties, and showed a low molding temperature so that their molding cycle time was as short as about 3 minutes.

It is clear from the above results that the flashes, defective moldings, etc. of the multi-layer plastic fuel tanks are reusable by blending them with virgin high-density polyethylene in the present invention.

Examples 13-20, Comparative Examples 5-8

Production of Mixture of Pulverized Multi-Layer Plastic Fuel Tank and High-Density Polyethylene A multi-layer plastic fuel tank (capacity: 40 liter) of a 3-type, 5-layer structure as shown in Table 1 was produced from high-density polyethylene, modified high-density polyethylene and polyamide by using a multi-layer blow molding machine (NB-60G, manufactured by The Japan Steel Works, Ltd.). The resulting multi-layer plastic fuel tank was pulverized by a crusher having a punching plate diameter of 8 mm.

The pulverized multi-layer plastic fuel tank and high-density polyethylene (virgin resin) were dry-blended at a weight ratio of 50:50 to produce a resin mixture.

Evaluation of Dispersibility of Polyamide

Each of the above resin mixtures was melt-blended at a resin temperature shown in Table 5 at an extrusion rate of 90 kg/hr or 180 kg/hr by using an extruder of the type shown in Table 5.

With respect to a parison thus obtained, a particle size of polyamide particles was measured, and a maximum extrusion rate at which the polyamide particle size of 10 μm or less could be obtained was defined as a maximum extrusion rate capable of giving good dispersion of polyamide. The dispersibility of polyamide particles was evaluated as "◯" when the polyamide particles had a particle size of 10 μm or less at an extrusion rate of 180 kg/hr, and "✕" when the polyamide particles had a particle size exceeding 10 μm at an extrusion rate of 180 kg/hr. The results are shown in Table 5 together with the type of polyamide used.

Parisons were produced at the maximum extrusion rate providing good dispersion of the polyamide and at half the maximum extrusion rate (½ maximum extrusion rate), and measured with respect to a tensile elongation and a tensile impact strength at $-40°$ C. according to a tensile test method (ASTM D638) and a tensile impact test (ASTM D1822), respectively.

The measured values of these properties were compared with those of parisons produced from virgin resins under the same conditions as above. The results are shown in Table 5.

TABLE 5

| | Example No. | | | | | |
|---|---|---|---|---|---|---|
| | 13 | 14 | 15 | 16 | 17 | 18 |
| Polyamide | PA-2 | PA-2 | PA-2 | PA-2 | PA-3 | PA-3 |
| Type of Extruder | (a) | (b) | (c) | (d) | (a) | (b) |
| Blending Temperature (°C.) | 230-250 | 230-250 | 230-250 | 230-250 | 230-250 | 230-250 |
| Particle Size of Polyamide (μm) | | | | | | |
| Extrusion Rate | | | | | | |
| 90 kg/hr | 1 or less | 1 or less | 1 or less | 1 or less | 1 or less | 1 or less |
| 180 kg/hr | 1 or less | 1 or less | 1 or less | 1 or less | 1 or less | 1 or less |
| Maximum Extrusion Rate (kg/hr) | 180 | 180 | 180 | 180 | 180 | 180 |
| Dispersibility | ◯ | ◯ | ◯ | ◯ | ◯ | ◯ |
| Tensile Properties of The Resulting Parison (%) | | | | | | |
| at ½ Maximum Extrusion Rate | 100 | 100 | 100 | 100 | 100 | 100 |
| at Maximum Extrusion Rate | 100 | 100 | 100 | 100 | 100 | 100 |

| | Example No. | | Comparative Example No. | | | |
|---|---|---|---|---|---|---|
| | 19 | 20 | 5 | 6 | 7 | 8 |
| Polyamide | PA-3 | PA-3 | PA-2 | PA-2 | PA-3 | PA-3 |

TABLE 5-continued

| | (c) | (d) | (e) | (f) | (e) | (f) |
|---|---|---|---|---|---|---|
| Type of Extruder | | | | | | |
| Blending Temperature (°C.) | 230–250 | 230–250 | 230–250 | 230–250 | 230–250 | 230–250 |
| Particle Size of Polyamide (μm) | | | | | | |
| Extrusion Rate | | | | | | |
| 90 kg/hr | 1 or less | 1 or less | 2–10 | 2–10 | 2–10 | 2–10 |
| 180 kg/hr | 1 or less | 1 or less | 50–200 | 50–200 | 50–100 | 50–100 |
| Maximum Extrusion Rate (kg/hr) | 180 | 180 | 90 | 90 | 180 | 180 |
| Dispersibility | ○ | ○ | X | X | X | X |
| Tensile Properties of The Resulting Parison (%) | | | | | | |
| at ½ Maximum Extrusion Rate | 100 | 100 | 90 | 90 | 90 | 90 |
| at Maximum Extrusion Rate | 100 | 100 | 80 | 80 | 80 | 80 |

It is clear from Table 5 that in the resin compositions for the high-density polyethylene layers produced according to the method of the present invention, the dispersed polyamide particles had a particle size of 1 μm or less at both extrusion rates of 90 kg/hr and 180 kg/hr, and that the resin compositions produced by the method of the present invention show as good tensile elongation and tensile impact strength as those of the resin compositions produced from the virgin resin.

In Comparative Examples 5–8, in which a usual single-screw extruder was used, the resin composition for the high-density polyethylene layer contained polyamide particles having a particle size of 10 μm or less at an extrusion rate of up to 90 kg/hr. However, at 180 kg/hr, the particle size of the polyamide particles was as large as 50–200 μm, and the resin composition showed reduced tensile elongation and tensile impact strength.

Examples 21–24, Comparative Examples 9, 10

Production of Multi-Layer Plastic Fuel Tanks and Evaluation of Their Properties

Flashes, defective moldings, etc. generated in the production of multi-layer fuel tanks for the evaluation test of dispersibility of polyamide were pulverized and dry-blended with virgin high-density polyethylene at a weight ratio of 50:50, and melt-blended at a temperature shown in Table 6 using a single-screw extruder (b), (c) or (e) as a main extruder of a multi-layer blow molding machine, to produce a multi-layer plastic fuel tank (40 liter, 6 kg) having a 3-type, 5-layer structure (two high-density polyethylene layers: 3300 μm (total), two modified high-density polyethylene layers: 100 μm (total), one polyamide layer: 100 μm). The moldability of the fuel tank was evaluated. The thickness ratio was about 94:3:3.

Each fuel tank was subjected to a drop impact test at −40° C. and a gasoline permeability test at 40° C. The results are shown in Table 6 together with the multi-layer structure of the fuel tank.

Example 25

Example 23 was repeated to produce a multi-layer plastic fuel tank except for changing the thickness ratio of two high-density polyethylene layers, two modified high-density polyethylene layers and one polyamide layer to 60:20:20. The drop impact test at −40° C. and the gasoline permeability test at 40° C. were carried out in the same manner as in Example 23. The results are shown in Table 6.

TABLE 6

| | Example No. | | | | | Comparative Example No. | |
|---|---|---|---|---|---|---|---|
| | 21 | 22 | 23 | 24 | 25 | 9 | 10 |
| Production Conditions of Multi-Layered Plastic Fuel Tank | | | | | | | |
| Type of Extruder | (b) | (b) | (c) | (c) | (c) | (e) | (e) |
| Polyamide | PA-2 | PA-3 | PA-2 | PA-3 | PA-2 | PA-2 | PA-3 |
| Blending Temperature of HDPE (°C.) | 230–250 | 230–250 | 230–250 | 230–250 | 230–250 | 230–250 | 230–250 |
| Ratio of HDPE:CMPE:PA | 94:3:3 | 94:3:3 | 94:3:3 | 94:3:3 | 60:20:20 | 94:3:3 | 94:3:3 |
| Properties | | | | | | | |
| Moldability[1] | ○ | ○ | ○ | ○ | ○ | ○ | ○ |
| Drop Impact Resistance[2] | ○ | ○ | ○ | ○ | ○ | X | X |
| Gasoline Barrier Property[3] | ○ | ○ | ○ | ○ | ○ | ○ | ○ |

Note
[1]Evaluation
○: Small drawdown of parison and moldable.
X: Large drawdown and uneven thickness distribution of parison.
[2]Measured by dropping the multi-layer plastic fuel tank filled with a mixed liquid (−40° C.) of water and ethylene glycol having the same weight as that of gasoline filling the fuel tank from a height of 6 m. Evaluation was as follows:
○: No break.
X: Broken.
[3]Measured according to ECE 34. Evaluation was as follows:
○: Gasoline permeability was 20 g/day or less.
X: Gasoline permeability exceeded 20 g/day.

It is clear from Table 6 that the multi-layer plastic fuel tank having high-density polyethylene layer produced from the resin composition according to the present invention is well moldable and has good impact strength and gas barrier properties. This is due to the fact that since fine polyamide particles are uniformly dispersed in high-density polyethylene, there is substantially no deterioration in the high-density polyethylene layer. On the other hand, the multi-layer plastic fuel tanks produced by the methods of Comparative Examples 9 and 10 were broken due to poor impact strength.

As described above, when the polyamide layer of the multi-layer plastic fuel tank is made of nylon 6–66, the resin temperature of high-density polyethylene in the course of extruding the parison can be lowered. Accordingly, the drawdown of the parison is effectively prevented, and the molding cycle time can be shortened.

Also, in a case where regenerated products of this multi-layer plastic fuel tank are blended with virgin high-density polyethylene to produce a composition for the high-density polyethylene layer of the multi-layer plastic fuel tank, the resulting high-density polyethylene composition contains fine polyamide particles dispersed uniformly therein, so that there is no substantial decrease in properties such as impact resistance, etc. This is because in the method of producing a multi-layer plastic fuel tank according to the present invention, a single-screw extruder provided with a screw having a special structure is used, and part or whole of the multi-layer plastic fuel tank is used as a regenerated product to be blended with virgin high-density polyethylene for the high-density polyethylene layer.

Such multi-layer plastic fuel tank of the present invention is economically advantageous because the flashes, defective moldings, etc. inevitably generated in the course of its production can be reused.

What is claimed is:

1. A heat and impact resistant blow-molded, multi-layer plastic fuel tank consisting of an inner and an outer high-density polyethylene layer, a central polyamide gas barrier layer and a modified high-density polyethylene layer between the central polyamide layer and the inner and outer high-density polyethylene layers, wherein
   (a) said high-density polyethylene layers having a density of 0.935 g/cm$^3$ or more and a total thickness of 1.5–5.2 mm;
   (b) said polyamide layer being made of a polyamide copolymer comprising 90–60 weight % of polyamide 6 and 10–40 weight % of polyamide 66 and having a thickness of 20–500 μm; and
   (c) said modified high-density polyethylene layer being made of high-density polyethylene modified with an unsaturated carboxylic acid or a derivative thereof and having a total thickness of 20–500 μm;
   the ratio of the total thicknesses of said layers (a), (b) and (c) being 99–60:0.5–20:0.5–20.

2. The blow-molded, multi-layer plastic fuel tank according to claim 1, wherein the high-density polyethylene layers contain 100 parts by weight of virgin high-density polyethylene and 20–200 parts by weight of regenerated high-density polyethylene obtained from a blow-molded, multi-layer plastic fuel tank as defined in claim 1.

3. The blow-molded, multi-layer plastic fuel tank according to claim 1, wherein the high-density polyethylene layers have a total thickness of 1.5–5.0 mm.

4. A heat and impact resistant, blow-molded, multi-layer, plastic fuel tank comprising:
   (a) at least one high-density polyethylene layer having a total thickness of 1.5–5 mm;
   (b) at least one polyamide gas barrier layer made of a blend of (i) a polyamide copolymer comprising 90–60 weight % of polyamide 6 and 10–40 weight % of polyamide 66 and (ii) a an olefinic elastomer modified with an unsaturated carboxylic acid or a derivative thereof, and having a total thickness of 20–500 μm; and
   (c) at least one modified high-density polyethylene layer made of high-density polyethylene modified with an unsaturated carboxylic acid or a derivative thereof having a total thickness of 20–500 μm interposed between each said high-density polyethylene layer and each said polyamide layer for bonding said high-density polyethylene layer and said polyamide layer;
   wherein the ratio of the total thicknesses of (a):(b):(c) is 99–60:0.5–20:0.5–20.

5. The blow-molded, multi-layer, plastic fuel tank according to claim 4, consisting of an inner and an outer high-density polyethylene layer, a central polyamide layer, and a modified high-density polyethylene layer between the central polyamide layer and the inner and outer polyethylene layers.

* * * * *